Oct. 21, 1941.    T. BRISKIN    2,259,550
WINDSHIELD HEATER
Filed Jan. 11, 1937    2 Sheets-Sheet 1
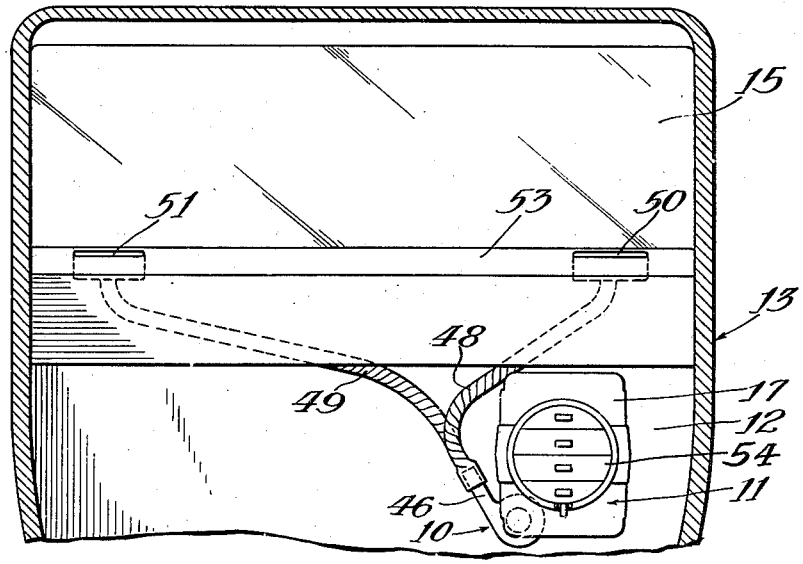
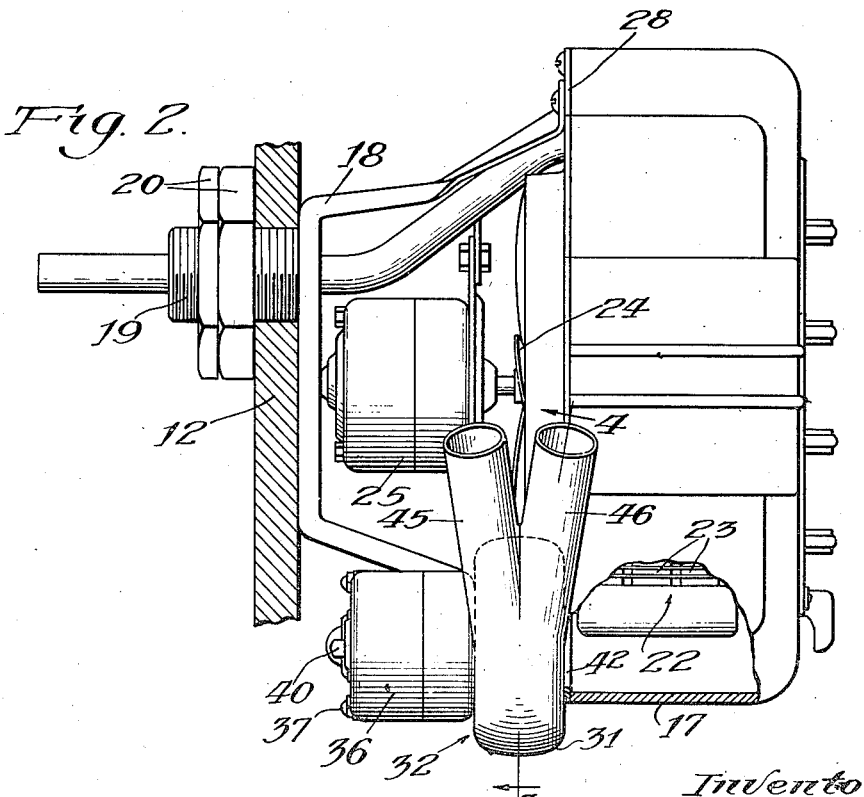

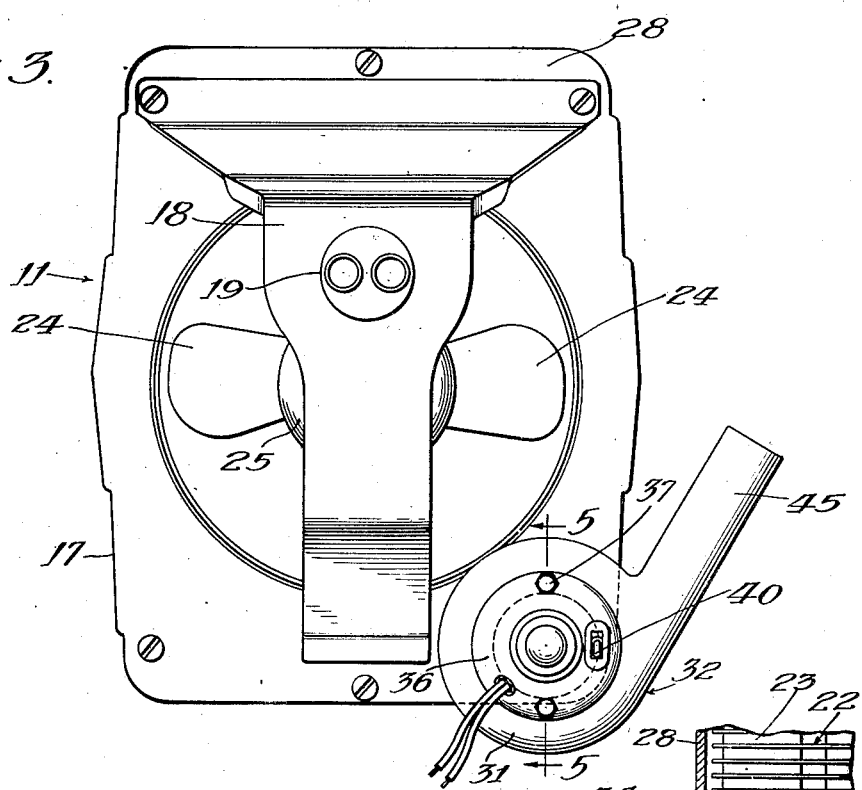
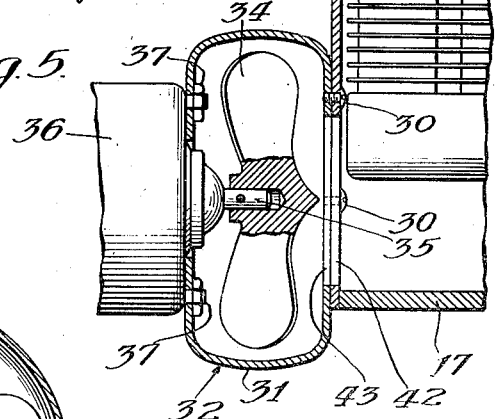
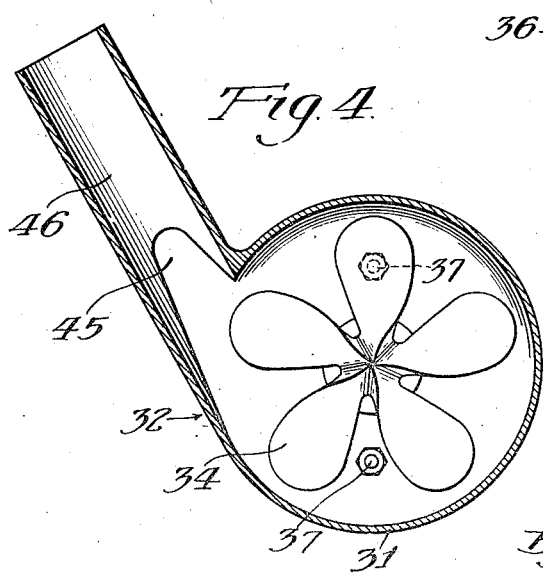

Patented Oct. 21, 1941

2,259,550

UNITED STATES PATENT OFFICE 2,259,550

WINDSHIELD HEATER

Theodore Briskin, Chicago, Ill., assignor to Excel Auto Radiator Company, Chicago, Ill., a corporation of Delaware Application January 11, 1937, Serial No. 120,128

1 Claim. (Cl. 20—40.5)

The invention relates to windshield heaters of the type commonly employed to prevent the accumulation of frost on the windshield of an automobile.

A primary object of the invention is to provide improved means for taking heated air from a supply thereof and bringing it into contact with a windshield to prevent the accumulation of frost thereon.

Other objects and advantages will appear as the following detailed description progresses, reference being had to the accompanying drawings, wherein—

Fig. 1 is a fragmentary vertical transverse section through the body portion of an automobile, a windshield heater embodying the invention being shown in connection with the automobile.

Fig. 2 is a side elevation of a blower device embodying the invention, the blower device being shown in connection with a heater of a type commonly employed to heat the interior of automobiles.

Fig. 3 is a front elevation of the blower device shown in Fig. 2, the automobile heater being shown in connection therewith.

Fig. 4 is an enlarged section taken on line 4—4 of Fig. 2, and

Fig. 5 is an enlarged section taken on line 5—5 of Fig. 3.

Referring for the present to Fig. 1, the reference character 10 designates generally a blower device which is illustrated in connection with an automobile heater 11 secured to a dashboard 12 of an automobile 13, the windshield of the automobile being shown at 15.

The automobile heater 11 may be of any suitable construction but preferably comprises means for utilizing the cooling system of the internal combustion engine of the automobile for heating the interior of the automobile. In this instance, the heater 11 comprises a housing 17 secured to the dashboard of the automobile by any suitable means such as a bracket 18, a screw-threaded member 19 projecting from the bracket 18, and a plurality of nuts 20, the dashboard 12 being clamped between the bracket 18 and the nuts 20.

Disposed within the housing 17 is a radiator core 22 comprising tubes 23 through which liquid from the cooling system of the internal combustion engine passes. A fan 24 driven by an electric motor 25 causes the air within the automobile to pass between the tubes 23 so that there is an exchange of heat between the cooling liquid and the air in the automobile. In practice, it has been found that substantially all of the air within the housing 17 becomes heated and air may be drawn from substantially any point of the housing by cutting a hole therethrough and such air will be heated.

The rear wall of the housing 11 is shown at 28 (Figs. 2, 3 and 5). Secured to the rear wall 28 of the housing 17 by screws 30, or the equivalent, is a housing 31 of a blower device which is designated generally by the reference character 32. Disposed within the housing 31 is a fan 34 mounted on the shaft 35 of an electric motor 36 which is secured to the housing by bolts 37. The electric motor 36 and the electric motor 25 are connected operatively to the electrical system of the automobile and derive their power therefrom. A switch 40 mounted on the housing of the electric motor 36 controls the operation of the motor.

Referring particularly to Fig. 5, it will be noted that the back wall or plate 28 of the housing 17 is provided with an aperture 42 which registers with an aperture 43 formed in the housing 31, the aperture 43 being the intake opening of the blower 32.

As best shown in Figs. 2, 3 and 4 the housing 31 has a plurality of discharge pipes 45 and 46 secured thereto in any suitable manner such as, for instance, by welding. The discharge pipes 45 and 46 converge toward each other from their outer ends toward the housing 31 so that at the housing the passages through the two pipes join each other and substantially constitute the discharge outlet for the blower 32 (Figs. 2 and 4). The walls of the two tubes 45 and 46 join each other in the discharge outlet of the blower 32 and as the angle between the two pipes is relatively acute, there is relatively little resistance to the discharge of air from the housing 31 through the pipes 45 and 46.

One end of the flexible rubber tube 48 is secured to the outer end of the pipe 46 and one end of a flexible tube 49 is connected to the outer end of the pipe 45. The other ends of the tubes 48 and 49 open into apertures or slots 50 and 51, respectively, provided in the framework 53 which holds the lower edge of the windshield 15, the apertures or slots 50 and 51 being disposed in such manner that when air is discharged through them from the tubes 48 and 49 it will impinge upon the inner side of the windshield 15 and spread over the inner surface thereof.

The operation of the above described apparatus is substantially as follows: If it is assumed that the automobile heater 11 is in operation, it is readily understood that when the motor 36 is set in operation, heated air will be withdrawn from the housing 17 through the apertures 42 and 43 by the fan 34 and this heated air will be discharged through the pipes 45 and 46, and the flexible tubes 48 and 49 into the apertures or slots 50 and 51 which will distribute the heated air over the inner surface of the windshield 15. This will prevent the formation of frost upon the outer surface of the windshield. By locating the opening 42 in the rear face of the housing 17, the air escaping through such opening under the influence of the blower 32 is hotter than that escaping through the large opening at the front, since such air is caused to pass downwardly and rearwardly along the walls of the radiator core 22 after having already passed forwardly through the core. The additional heat thus acquired causes the air streams as delivered on the windshield to be particularly effective for defrosting.

It will be noted that for each of the slots 50 and 51 separate passageway is provided extending from the blower 32 to the slot so that the flow of heated air is not interrupted to any appreciable degree. It will be readily understood that if a single flexible tube lead from the housing 31 and then branched to provide passages to the slots 50 and 51 there would be considerable resistance at the point of branching to the flow of the heated air. Apparatus embodying the invention therefore insures that a relatively large flow of heated air will impinge against the windshield 15 and thus effectually prevent the formation of sufficient frost on the windshield to hinder the driver.

It will be further noted that as illustrated, the heater casing 17 is provided with the rather usual shutters 54 which may be closed to stop circulation of air through the outlet of the casing. The provision of these shutters with the two fans 24 and 34 separately motor driven and the port 42 separate from the opening controlled by the shutters 54, makes up a very flexible system for defrosting a windshield. By this combination of devices five differing degrees of heating effect may be delivered to the windshield, it being remembered that the heat effect will vary with volume of air delivered as well as with the temperature thereof.

1st with fan 24 operating, fan 34 idle, and the shutters 54 open a very mild current of air will flow through the nozzles 50, 51:

2nd with the fan 24 idle, fan 34 operating and shutters 54 open a stronger blast will be delivered but the air will not be so warm due to the ample inlet through both the front and back of casing 17:

3d with the fan 24 idle, fan 34 operating and shutters 54 closed, a still greater heating effect will be had as the will enter the opening for fan 24 and substantially all pass through the radiator 22, 23:

4th with fan 24 operating, fan 34 idle and shutters 54 closed a still greater effect will be produced because of the greater size of fan 24: and 5th with both fans operating and shutters 54 closed all air forced into the casing 17 by fan 24 must flow out through port 42 and assisted by fan 34 a maximum volume of air at a maximum temperature will be delivered to the nozzle or nozzles.

The flexibility of this apparatus enables all conditions to be met from the mildest to the most strenuous.

I claim:

In an automobile defrosting apparatus, the combination of a housing having openings in its front and rear faces and a third comparatively much smaller opening in its rear face at the lower portion thereof, a radiator in said housing between said openings and comprising a lower hot water header adjacent said third opening, adjustable shutters for closing the opening in the front face of the housing, an axial type fan mounted in the larger opening in the rear face of the housing, a motor for driving said fan for forcing air into and through said radiator, blower means of the centrifugal type for taking air from said housing independently of the opening in the front face and comprising a second housing fixedly mounted on said first-named housing in communication therewith through said third opening and a fan rotatably mounted in said second housing for driving air therefrom, and a second motor mounted on and carried by said second housing and operable independently of said first-named motor for causing air to be drawn past said first-named fan and through said radiator independently of the action of said first-named fan.

THEODORE BRISKIN.